Jan. 23, 1934.  E. BROCKEL  1,944,728

MATRICE MOLDING PRESS

Filed Dec. 22, 1931

Inventor:
Ernst Brockel
By Alfred Stern
Atty.

Patented Jan. 23, 1934

1,944,728

UNITED STATES PATENT OFFICE 1,944,728

MATRIX MOLDING PRESS

Ernst Brockel, Augsburg, Germany, assignor to Maschinenfabrik Augsburg-Nurnberg A. G., Augsburg, Germany, a corporation of Germany Application December 22, 1931, Serial No. 582,530, and in Germany December 27, 1930

4 Claims. (Cl. 101—12)

In hydraulic presses for molding matrices for stereotyping, or like uses, it is necessary to guide the upward motion of the table in such manner, that its upper surface during the rise may remain perfectly parallel with the lower surface of the molding head. Parallelism in most of the known machines of this kind has hitherto been ensured by means of lateral guiding shoes which are fastened to the table top, or noses forming part of the table top, gliding along pull rods of rectangular or round cross section, in conjunction with the pressure piston which is screwed to the table.

In other machines lateral guides are dispensed with and the table motion is guided entirely by means of the pressure piston; in these cases the pressure piston in order to avoid tilting has to be relatively long.

Both methods have certain disadvantages. When during operation the table is heated, it expands. In order to avoid cramping considerable play has to be allowed for the guiding shoes and noses. Because of this play, the form to be molded may contact obliquely with the molding head, which not only results in faulty matrices, but also unduly strains the frame. If the table motion is to be guided by means of the pressure piston only, the piston, for the reasons already mentioned, has to be of great length. The press consequently becomes excessively high, and the table top is placed at such a great distance from the floor as to render service difficult. By the present invention all these drawbacks are avoided.

In the machine according to the present invention the table motion is guided by a special guide piston and neither the pull rods nor the pressure piston take any part in this function.

Figure 1:
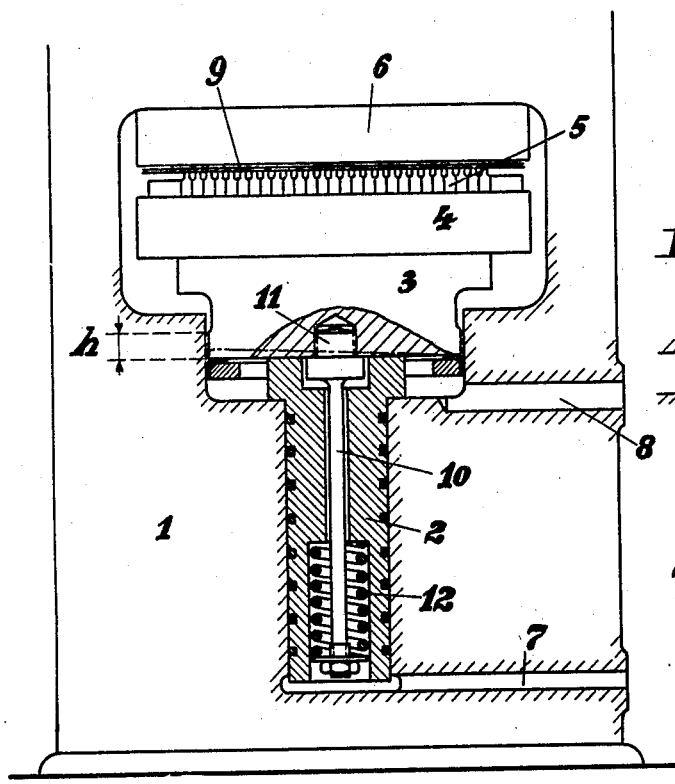
Figure 2:
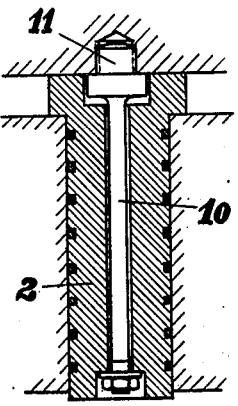

On the annexed drawing, I have shown for purposes of illustration in Fig. 1 a side view of a preferred form of the novel molding press, and in Fig. 2 a modification of the essential detail thereof.

Into a base of the frame 1 an oil tight piston 2 having a smaller diameter than the pressure piston 3 is fitted which is adapted to lift speedily the pressure piston 3 together with the table 4 and the type to be molded 5, so as to press the latter against the molding head 6. The lifting is effected by oil supplied under pressure through a duct 7. Through another duct 8 a liquid is sucked, in well-known manner, from a vessel (not shown) into the space under the pressure piston 3. At a later stage of the molding operation hydraulic pressure will also bear upon the pressure piston 3.

Until the type touches the molding head 6, the table is guided with extreme accuracy, since the piston 2 moves without play within its bore. It would be a mistake to make piston 2 and pressure piston 3 in one piece, in order to secure rigid connection or, for the same purpose, to screw the piston 2 by means of a flange onto the pressure piston, because in case the type 5 or the packing 9 were of uneven thickness, the table 4 and the pressure piston 3 would assume a slightly oblique position, and in consequence the connecting portions of the piston 2 and the pressure piston 3, or the piston 2 might suffer damage.

According to the invention the piston 2 is connected with the pressure piston 3 in a novel manner, by means of a rod 10 having a threaded head 11 of larger diameter than the rod, which head is screwed into the lower part of pressure piston 3. Rod 10 is, with play, disposed within a bore of the piston 2, and in conjunction with a strong spring 12 causes the two pistons to be pressed against one another. The spring 12 is previously compressed sufficiently to render the connection practically rigid, and perfect alignment during the upward motion of the pressure piston 3 is thus ensured.

As soon however as the pressure piston 3 begins to exert pressure upon the molding head, and loads of considerably greater amount result, the pressure piston is free to assume an oblique position should this become necessary because of uneven thickness of either the type 5 or the packing 9. Such obliquity of position is made possible by a slight additional compression of the spring 12. In view of the extraordinary amount of the loads which obtain during the lift, it is admissible to designate connection and guidance as being yielding during the actual molding process.

Instead of the connection above described, within the scope of the invention, any other kind of yielding and elastic connection may, of course, be applied as, for example, that shown in Fig. 2. The spring in this case has been omitted and the rod 10 is made very long and of some highly elastic material e. g. steel, or a steel alloy; the slight tensions which may occur when dealing with unevenly thick type or packing are taken up elastically by a rod of this nature. Since the pressure piston 3 does not take part in the guiding of its upward motion it may be allowed a great deal of play and the fitting section $h$ of its circumferential surface may be so narrow, that in case of necessity, the table may easily assume the requisite oblique position.

I claim:

1. In a hydraulic molding press, a guide piston slidably mounted for only straight line movement, a separate pressure piston yieldably mounted on the guide piston, means for the actuation of the guide piston to move the pressure piston therewith to an operative position, and separate means for the subsequent actuation of the pressure piston independently of the guide piston.

2. In a hydraulic molding press, a guide piston slidably mounted for only straight line movement, a separate pressure piston, a rod connecting said pistons together, said rod having sufficient flexibility to permit slight rocking of the pressure piston relative to the guide piston, means for the actuation of the guide piston to move the pressure piston to an operative position, and means for the subsequent actuation of the pressure piston independently of the guide piston.

3. In a hydraulic molding press, a guide piston slidably mounted for only straight line movement, a separate pressure piston, a rod secured rigidly at one end to the pressure piston and extending through the guide piston, an abutment on the other end of said rod, a coil spring between the guide piston and said abutment holding the two pistons yieldably in assembly with each other, and means for the actuation of said pistons.

4. In a hydraulic molding press, a guide piston slidably mounted for only straight line movement, a separate pressure piston, the guide piston having a central opening, a flexible rod connected at one end to the pressure piston and extending loosely through the central opening in the guide piston, an abutment on the other end of said rod engaging the guide piston whereby the pressure piston is held yieldably in assembly with the guide piston, and means for the actuation of said pistons.

ERNST BROCKEL.